United States Patent
Yoshimoto

(10) Patent No.: US 7,366,485 B2
(45) Date of Patent: Apr. 29, 2008

(54) MULTIMODE WIRELESS TRANSMITTER AND A PORTABLE WIRELESS DEVICE USING THE SAME

(75) Inventor: Atsushi Yoshimoto, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 478 days.

(21) Appl. No.: 11/068,927

(22) Filed: Mar. 2, 2005

(65) Prior Publication Data

US 2005/0197078 A1 Sep. 8, 2005

(30) Foreign Application Priority Data

Mar. 4, 2004 (JP) ............................. 2004-060759

(51) Int. Cl.
*H04B 1/40* (2006.01)
*H04B 1/04* (2006.01)
*H01Q 11/12* (2006.01)

(52) U.S. Cl. ................... 455/127.4; 455/112; 455/118; 455/168.1; 455/188.1; 455/313; 455/315; 455/318; 455/323

(58) Field of Classification Search ............. 455/127.4, 455/552.1, 76, 91, 101–102, 260, 168.1, 455/553.1, 93, 323, 318–319, 258–259, 118–119, 455/165.1, 313–316, 333, 146–147, 112–113, 455/183.1, 188.1–188.2, 180.1–180.2, 205–210, 455/255–257, 141, 86; 325/216

See application file for complete search history.

(56) References Cited

U.S. PATENT DOCUMENTS

| | | | | |
|---|---|---|---|---|
| 5,852,784 A | * | 12/1998 | Ito et al. ................... | 455/552.1 |
| 6,014,551 A | * | 1/2000 | Pesola et al. ................. | 455/86 |
| 6,151,354 A | * | 11/2000 | Abbey ........................ | 375/211 |
| 6,269,253 B1 | * | 7/2001 | Maegawa et al. .......... | 455/552.1 |
| 6,434,401 B1 | * | 8/2002 | Recouly ...................... | 455/555 |
| 6,714,772 B2 | | 3/2004 | Kasahara et al. | |
| 6,731,923 B2 | * | 5/2004 | Atkinson ..................... | 455/323 |
| 6,766,178 B1 | * | 7/2004 | Damgaard et al. ........ | 455/552.1 |
| 6,944,437 B2 | * | 9/2005 | Yang et al. .................. | 455/323 |
| 7,092,676 B2 | * | 8/2006 | Abdelgany et al. ........... | 455/76 |
| 7,116,950 B2 | | 10/2006 | Tanaka et al. | |
| 7,162,216 B2 | | 1/2007 | Kasahara et al. | |
| 7,236,542 B2 | * | 6/2007 | Matero ........................ | 375/295 |
| 7,239,846 B2 | * | 7/2007 | Chiu et al. ..................... | 455/42 |
| 2001/0016476 A1 | | 8/2001 | Kasahara et al. | |
| 2002/0137460 A1 | * | 9/2002 | Sun et al. ..................... | 455/41 |
| 2003/0092416 A1 | | 5/2003 | Tanaka et al. | |
| 2004/0005913 A1 | * | 1/2004 | Bollenbeck .............. | 455/562.1 |
| 2004/0043727 A1 | * | 3/2004 | Sato ........................... | 455/102 |
| 2004/0162047 A1 | | 8/2004 | Kasahara et al. | |

(Continued)

FOREIGN PATENT DOCUMENTS

JP 2000-13274 1/2000

(Continued)

*Primary Examiner*—Pablo N. Tran
(74) *Attorney, Agent, or Firm*—Wenderoth, Lind & Ponack, L.L.P.

(57) ABSTRACT

The circuits of a multimode wireless transmitter are complex and large, and thus difficult to incorporate in a portable wireless device. This problem is solved for a multimode wireless transmitter by enabling the first frequency mode circuit and the second frequency mode circuit to use the same frequency dividers.

9 Claims, 5 Drawing Sheets

U.S. PATENT DOCUMENTS

| | | |
|---|---|---|
| 2005/0014476 A1 | 1/2005 | Oono et al. |
| 2005/0032493 A1* | 2/2005 | Sugiyama et al. ....... 455/168.1 |
| 2005/0159180 A1* | 7/2005 | Cheng et al. ............ 455/552.1 |
| 2006/0141952 A1* | 6/2006 | Kung et al. ................. 455/102 |
| 2006/0223487 A1* | 10/2006 | Alam et al. ................. 455/344 |
| 2006/0276146 A1* | 12/2006 | Suzuki et al. ............ 455/114.3 |
| 2006/0276147 A1* | 12/2006 | Suzuki et al. ............ 455/114.3 |
| 2007/0015472 A1* | 1/2007 | Murtojarvi et al. ......... 455/102 |
| 2007/0021076 A1 | 1/2007 | Tanaka et al. |
| 2007/0099580 A1* | 5/2007 | Hosokawa et al. ........... 455/76 |
| 2007/0155345 A1* | 7/2007 | Wiegner et al. .............. 455/83 |

FOREIGN PATENT DOCUMENTS

| | | |
|---|---|---|
| JP | 2000-13278 | 1/2000 |
| JP | 2001-237699 | 8/2001 |
| JP | 2003-152563 | 5/2003 |
| JP | 2003-152815 | 5/2003 |

\* cited by examiner

MULTIMODE WIRELESS TRANSMITTER AND A PORTABLE WIRELESS DEVICE USING THE SAME

BACKGROUND OF THE INVENTION

1. Field of the Invention

The present invention relates generally to a high frequency integrated circuit used in a portable wireless communication device, and relates more particularly to a multimode wireless transmitter affording low power consumption in a smaller and lighter device, and to a portable wireless device using said multimode wireless transmitter.

2. Description of Related Art

Mobile communication devices increasingly feature functions affording compatibility with different communication systems, and multiband systems that operate across multiple frequency bands are becoming more common. Wireless devices compatible with such systems are extremely complex, necessitate large scale circuits, and have multiple oscillators that can result in spurious errors. See, for example, Japanese Unexamined Patent Application 2000-13274.

Conventional dual-mode portable communication terminals that operate on two frequency bands have two completely separate transmission channels with the RF sections tuned to separate frequencies and sharing few parts. Reducing the size, weight, and power consumption is therefore extremely difficult.

The present invention is directed to solving the foregoing problems of the prior art, and an object of the invention is to provide a multimode wireless transmitter affording a reduction in size, weight, and power consumption by using a common orthogonal modulator and amplifier in the transmission channels of a dual-mode portable communication terminal that operates on two frequency bands, providing a switch at the amplifier output to selectively supply signals to the transmission circuits in the different modes, and controlling changing the operating mode of the oscillator and two frequency dividers by means of a switch. A further object of the invention is to provide a portable wireless device using this multimode wireless transmitter.

SUMMARY OF THE INVENTION

A multimode wireless transmitter according to a first aspect of the present invention has a first oscillator that oscillates at a first predetermined frequency; a first frequency divider that frequency divides the frequency of the signal generated by the first oscillator by 2, and outputs a first carrier foIa and a second carrier foQa with a 90 degree phase difference therebetween; a second oscillator that oscillates at a second predetermined frequency that is different from the first predetermined frequency generated by the first oscillator; a second frequency divider that frequency divides the frequency of the signal generated by the second oscillator by 2; a third frequency divider that further divides the frequency of the output signal of the second frequency divider by 2, and outputs a third carrier foIb and a fourth carrier foQb with a 90 degree phase difference therebetween; a first switching amplifier that receives the first carrier foIa and third carrier foIb, selects the first or third carrier based on a control signal applied thereto, and amplifies and outputs the selected carrier; a second switching amplifier that receives the second carrier foQa and fourth carrier foQb, selects the second or fourth carrier based on a control signal applied thereto, and amplifies and outputs the selected carrier; and an orthogonal modulator for orthogonally modulating the baseband signal by means of the output signals from the first and second switching amplifiers.

Preferably, this multimode wireless transmitter also has a fourth frequency divider for frequency dividing the output signal frequency of the first frequency divider by 2; a third switching amplifier that receives the output signal from the third frequency divider and the output signal from the fourth frequency divider, selects either output signal based on a control signal applied thereto, and amplifies and outputs the selected output signal; a frequency synthesizer for comparing the selected output signal with a predetermined reference signal, and outputting a signal denoting the phase shift; and a loop filter for receiving the output signal of the frequency synthesizer. The oscillation frequency of the first oscillator or second oscillator is stabilized using output from the loop filter.

Yet further preferably, the first frequency divider and second frequency divider are combined in a single frequency divider.

Yet further preferably, the third frequency divider and fourth frequency divider are combined in a single frequency divider.

Yet further preferably, the first oscillator and second oscillator are combined in a single oscillator.

A multimode wireless transmitter according to a second aspect of the invention has a first oscillator that oscillates at a first predetermined frequency; a first frequency divider that frequency divides the frequency of the signal generated by the first oscillator by 2, and outputs a first carrier foIa and a second carrier foQa with a 90 degree phase difference therebetween; a second oscillator that oscillates at a second predetermined frequency that is different from the frequency generated by the first oscillator; a second frequency divider that frequency divides the frequency of the signal generated by the second oscillator by 2; a third frequency divider that further divides the frequency of the output signal of the second frequency divider by 2, and outputs a third carrier foIb and a fourth carrier foQb with a 90 degree phase difference therebetween; a first switching amplifier that receives the first carrier foIa and third carrier foIb, selects the first or third carrier based on a control signal applied thereto, and amplifies and outputs the selected carrier; a second switching amplifier that receives the second carrier foQa and fourth carrier foQb, selects the second or fourth carrier based on a control signal applied thereto, and amplifies and outputs the selected carrier; an orthogonal modulator for orthogonally modulating the baseband signal by means of the output signals from the first and second switching amplifiers; a first processing circuit; a second processing circuit; a switch for selecting the first antenna duplexing means or second antenna duplexing means; and an antenna connected to said switch. The first processing circuit has a first amplification means for amplifying output from the orthogonal modulator, and a first antenna duplexing means connected to the first amplification means, said first amplification means and first antenna duplexing means becoming operable when the first carrier foIa and second carrier foQa are selected. The second processing circuit has a second amplification means for amplifying output from the orthogonal modulator, and a second antenna duplexing means connected to the second amplification means, said second amplification means and second antenna duplexing means becoming operable when the third carrier foIb and fourth carrier foQb are selected.

EFFECT OF THE INVENTION

The number of oscillators can be reduced, the orthogonal modulator and amplifier can be shared, and the number of input terminals for baseband signals from the baseband signal processor can be reduced in a dual-mode wireless transmitter thus comprised because the intermediate frequency band is not used. The size of a portable wireless device using this multimode wireless transmitter can thus be reduced.

The present invention can also reduce the number of oscillators by not using the intermediate frequency band, reduce device size because the modulator can be shared, reduce the number of baseband signal input terminals from the baseband signal processor by sharing the orthogonal modulator, and facilitate adjusting for carrier leaks.

Other objects and attainments together with a fuller understanding of the invention will become apparent and appreciated by referring to the following description and claims taken in conjunction with the accompanying drawings.

DETAILED DESCRIPTION OF THE PREFERRED EMBODIMENTS

Preferred embodiments of the present invention are described below with reference to the accompanying figures.

Figure 1:
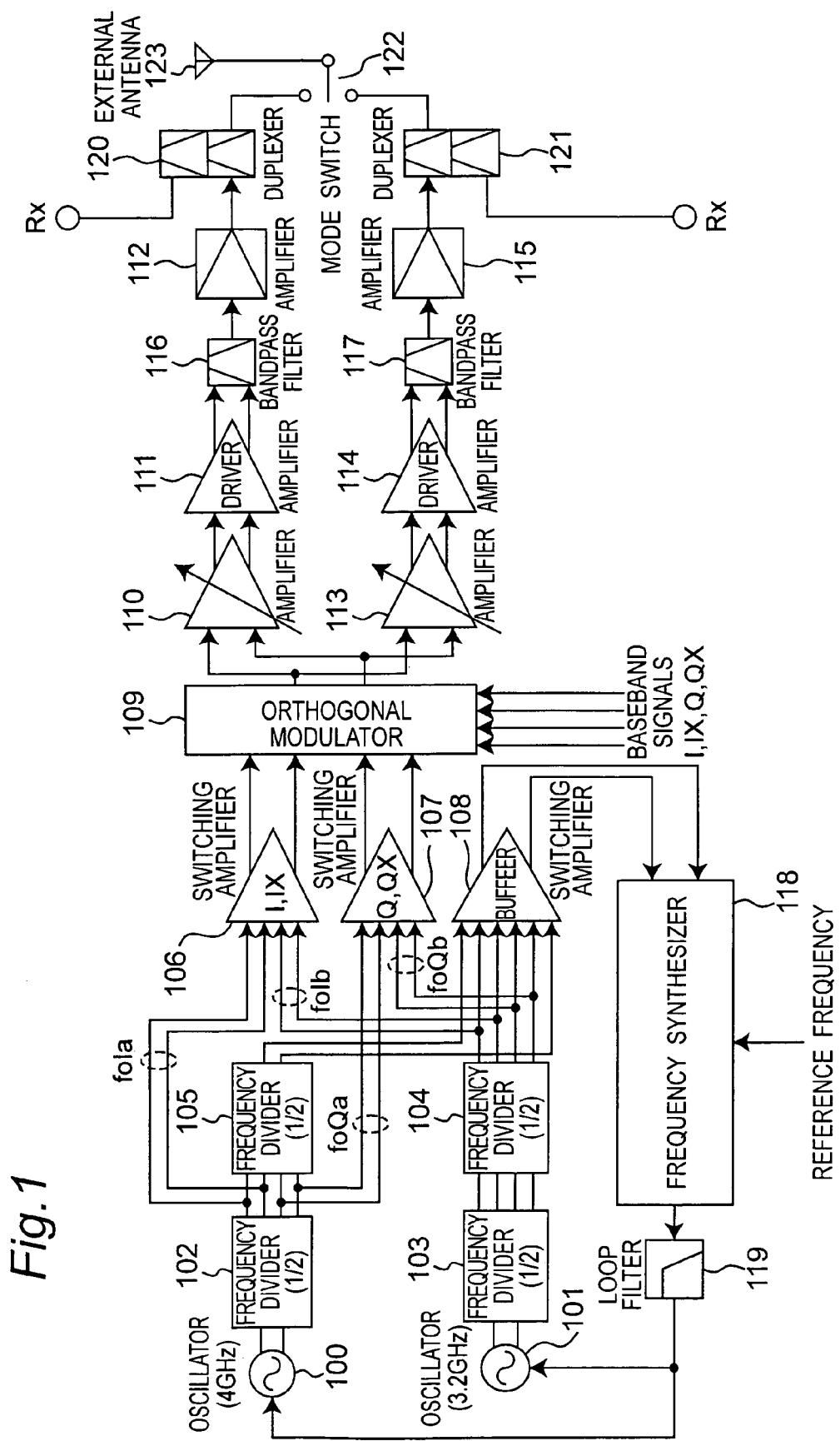
FIG. 1 is a schematic block diagram of a multimode wireless transmitter according to a first embodiment of the present invention.

FIG. 1 is a schematic block diagram showing the arrangement of a multimode wireless transmitter according to a first embodiment of the present invention. Shown in FIG. 1 are first and second oscillators 100, 101; first, second, third, and fourth frequency dividers 102, 103, 104, 105; first, second, and third switching amplifiers 106, 107, 108 having a switch function for selectively outputting one of two inputs; orthogonal modulator 109; first, second, third, fourth, fifth, and sixth amplifiers 110, 111, 112, 113, 114, 115; first and second bandpass filters 116, 117; frequency synthesizer 118 (variable frequency divider); loop filter 119; first and second duplexers 120, 121; mode switch 122; and external antenna 123.

The operation of a multimode wireless transmitter thus comprised is described below.

When operating in a first frequency (2 GHz) mode, the first oscillator 100 generates a signal of frequency F1. In this embodiment of the invention frequency F1 is 4 GHz by way of example. The first frequency divider 102 divides this signal by N1 (1/N1 frequency division), and outputs two carriers foIa and foQa with a 90 degree phase difference. In this embodiment the first frequency divider 102 divides by 2 (N1=2) and thus outputs two 2-GHz carriers. The first switching amplifier 106 amplifies carrier foIa, and the second switching amplifier 107 amplifies the other carrier foQa at a 90 degree phase difference. The output signals from the switching amplifiers 106, 107 and the baseband signal from the baseband signal processor are input to the orthogonal modulator 109 to acquire a modulated signal. A first carrier foIa and a second carrier foQa are thus selected and processed when operating in this first frequency mode.

Output from the orthogonal modulator 109 is then amplified by the first and second amplifiers 110, 111, frequencies outside the required frequency band are removed by the first bandpass filter 116, and the third amplifier 112 amplifies the transmission signal, which is then passed through the first duplexer 120 and mode switch 122 and transmitted from the external antenna 123.

The first and second amplifiers 110, 111, first bandpass filter 116, and third amplifier 112 thus constitute a first processing circuit that operates when in the first frequency mode.

The fourth frequency divider 105 divides the output from the first frequency divider 102 by Na (1/Na frequency division) where Na is 2 in this embodiment, and thus outputs a 1-GHz signal. After the 1-GHz signal from the fourth frequency divider 105 is amplified by the third switching amplifier 108, the frequency synthesizer (variable frequency divider) 118 divides the amplified signal to a comparison frequency, compares the result with an externally supplied reference frequency, and outputs a signal corresponding to the phase shift. The output from the frequency synthesizer 118 is passed through the loop filter 119 and applied to the first oscillator 100. This loop stabilizes the frequency of the carrier wave output from the first oscillator 100.

When operating in the second frequency mode (800 MHz), the second oscillator 101 produces a frequency F2 signal where frequency F2 is 3.2 GHz, for example. The second frequency divider 103 divides this signal by N2 (1/N2 frequency division where N2=2 in this embodiment), and the third frequency divider 104 further divides the first frequency-divided output by N3 (1/N3 frequency division where N3=2 in this embodiment), thus outputting two 800-MHz carriers foIb and foQb at a 90 degree phase difference. The first switching amplifier 106 then amplifies carrier foIb, and second switching amplifier 107 amplifies the other 90-degree phase shifted carrier foQb. The output signals from the switching amplifiers 106, 107 and the baseband signal from the baseband signal processor are input to the orthogonal modulator 109 to acquire a modulated signal. A third carrier foIb and a fourth carrier foQb are thus selected and processed when operating in this second frequency mode.

Note that these two frequency dividers 103 and 104 could be combined in a single (1/N2*N3) frequency divider, or more specifically a 1/4 frequency divider in this example.

This output from the orthogonal modulator 109 is then amplified by fourth and fifth amplifiers 113, 114, frequencies outside the required frequency band are removed by the second bandpass filter 117, and the sixth amplifier 115 amplifies the transmission signal, which is then passed through the second duplexer 121 and mode switch 122 and transmitted from the external antenna 123.

The fourth and fifth amplifiers 113, 114, second bandpass filter 117, and sixth amplifier 115 thus constitute a first processing circuit that operates when in the first frequency mode.

After the 800-MHz signal output from the third frequency divider 104 is amplified by the third switching amplifier 108, the frequency synthesizer (variable frequency divider) 118 divides the amplified signal to a comparison frequency, compares the result with an externally supplied reference frequency, and outputs a signal corresponding to the phase shift. The output from the frequency synthesizer 118 is passed through the loop filter 119 and applied to the second oscillator 101. This loop stabilizes the frequency of the carrier wave output from the second oscillator 101.

Figure 2:
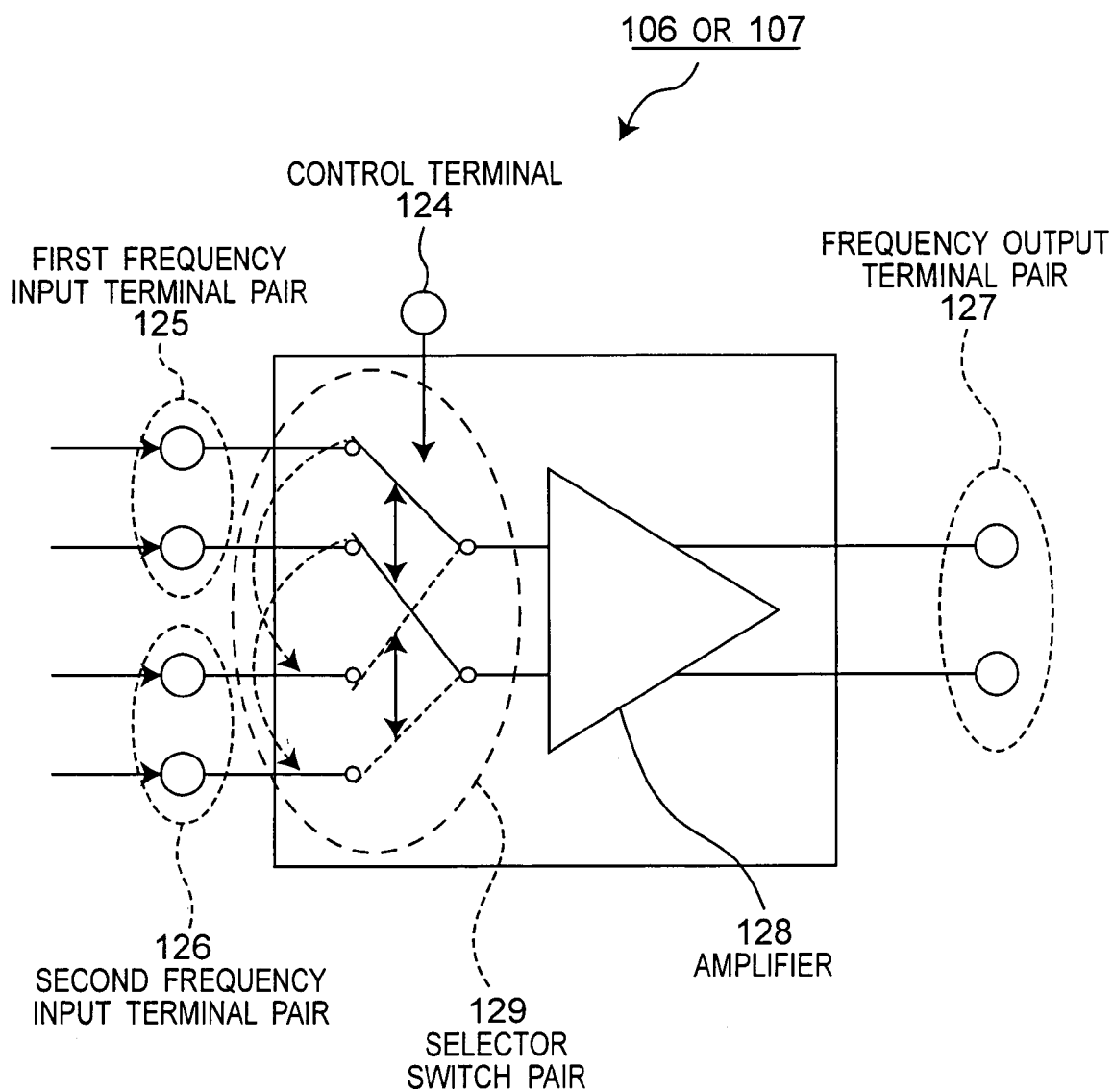
FIG. 2 is a block diagram showing the internal arrangement of the switching amplifiers in this first embodiment of the invention.

Switching between the first frequency mode and the second frequency mode is effected by a signal applied to the control terminal 124 as shown in FIG. 2 and described below.

In general, the operating current increases as the frequency being divided increases in a frequency divider that processes high frequency signals, and the frequency divider must be capable of handling a high current flow. This is dependent upon the frequency characteristics of the transistors forming the frequency divider, and a high current flow is necessary to prevent a drop in the output amplitude relative to the input amplitude. The fourth frequency divider 105 thus requires less operating current because the fourth frequency divider 105 operates at a lower frequency than the first frequency divider 102. The third frequency divider 104 likewise frequency divides a lower frequency than the second frequency divider 103, and thus also requires less operating current.

Figure 3:
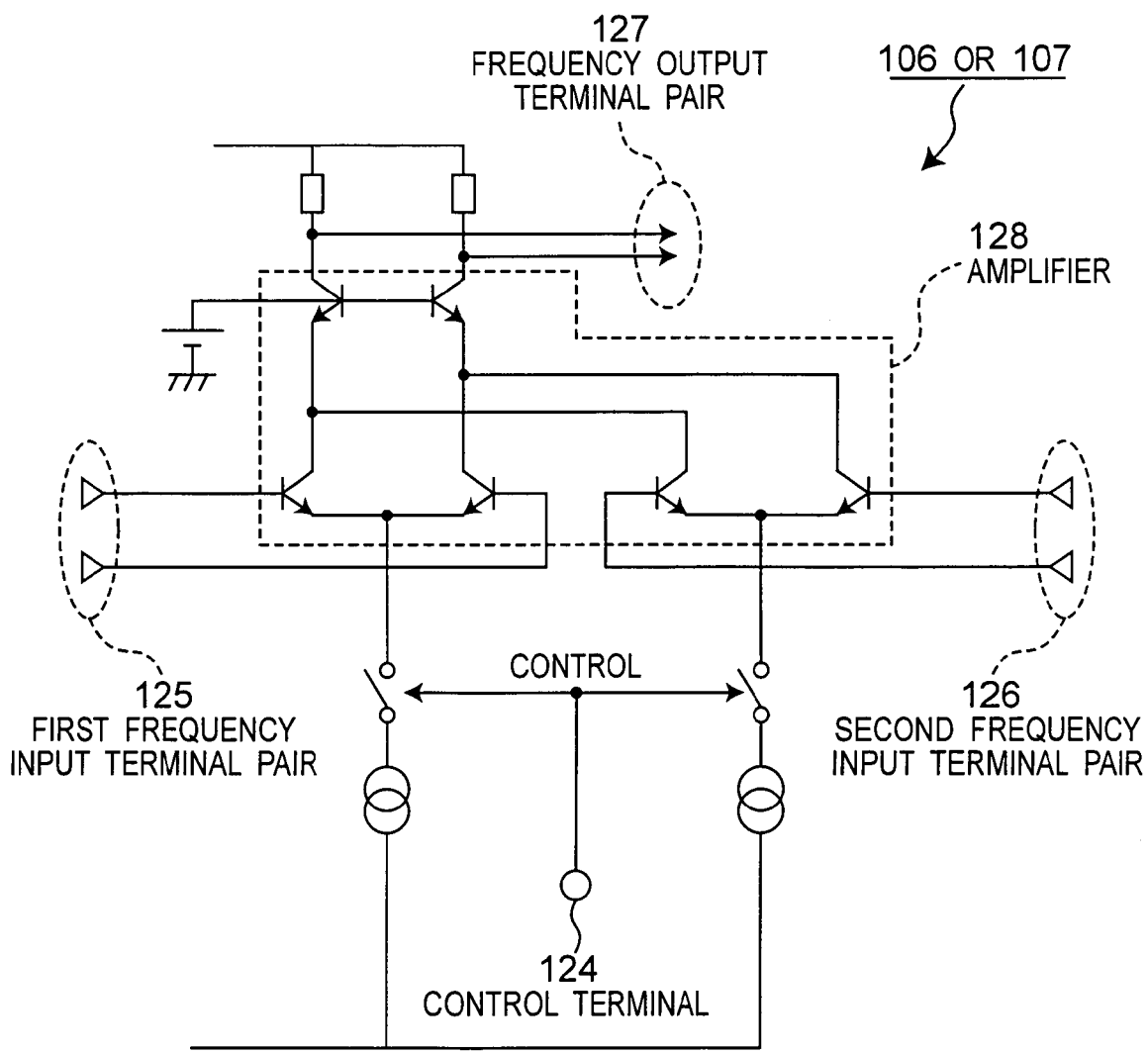
FIG. 3 is a circuit diagram of the switching amplifiers in this first embodiment of the invention.

FIG. 2 is a block diagram showing the internal configuration of the first and second switching amplifiers 106, 107 shown in FIG. 1 in this first embodiment of the invention, and FIG. 3 is a circuit diagram of the same. Shown in FIG. 2 and FIG. 3 are the control terminal 124, first and second frequency input terminal pairs 125 and 126, frequency output terminal pair 127, amplifier 128, and selector switch pair 129.

The first switching amplifier 106 and second switching amplifier 107 for outputting signals are configured as shown in FIG. 2 and thus apply a control signal for selecting the 2-GHz mode (first frequency) or the 800-MHz mode (second frequency) from the first frequency input terminal pair 125 or second frequency input terminal pair 126, respectively, to the control terminal 124, thereby controlling the position of the selector switch pair 129 so that a signal of the first frequency or second frequency is amplified by the amplifier 128 and output from the frequency output terminal pair 127.

As shown in FIG. 3, signals are input from the first frequency input terminal pair 125 in the 2-GHz mode, a 2-GHz mode selection signal is applied to the control terminal 124, signals are amplified by the amplifier 128, and signals are then output from the frequency output terminal pair 127.

The number of oscillators is thus reduced by not using the intermediate frequency band, the modulator can be used in both the 2-GHz mode and 800-MHz mode, and size can therefore be reduced.

Note that the 2-GHz mode and 800-MHz mode are used in this first embodiment of the invention by way of example only, and the invention can be used to the same effect when operating at other frequencies.

Figure 4:
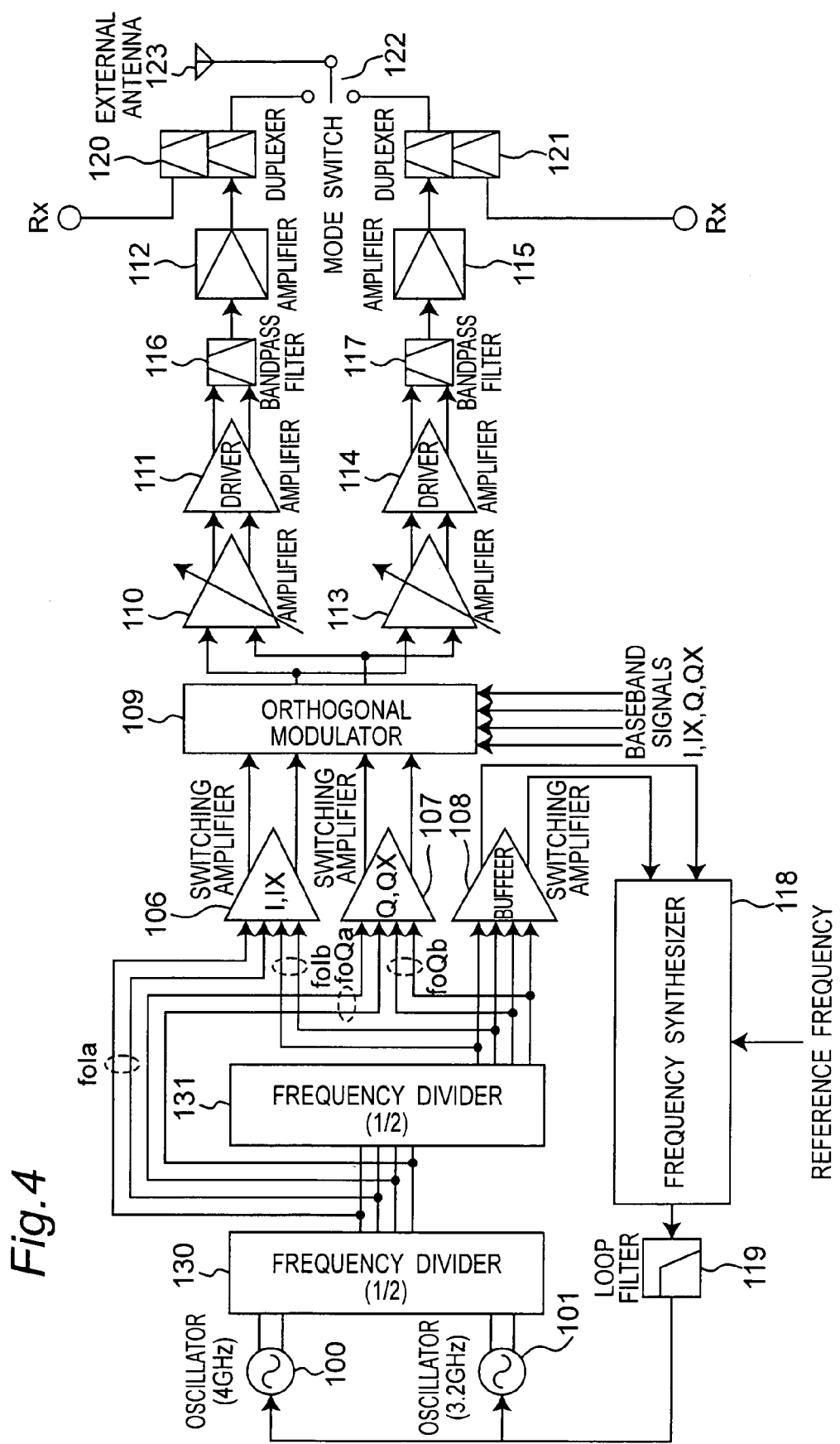
FIG. 4 is a schematic block diagram of a multimode wireless transmitter according to a second embodiment of the present invention.

FIG. 4 is a schematic block diagram of a multimode wireless transmitter according to a second embodiment of the invention. Note that like parts having the same function in this and the first embodiment shown in FIG. 1 are identified by the same reference numerals, and further description thereof is omitted below. This embodiment differs from the first embodiment in comprising a fifth frequency divider 130 and a sixth frequency divider 131.

When operating in a first frequency (2 GHz) mode, the first oscillator 100 generates a 4-GHz signal, for example, which the fifth frequency divider 130 divides into two 2-GHz carriers foI and foQ with a 90 degree phase difference. The first switching amplifier 106 amplifies carrier foI, and the second switching amplifier 107 amplifies the other 90-degree phase shifted carrier foQ. The amplifier output signals and the baseband signal from the baseband signal processor are input to the orthogonal modulator 109, which outputs a modulated signal.

Output from the orthogonal modulator 109 is then amplified by the first and second amplifiers 110, 111, frequencies outside the required frequency band are removed by the first bandpass filter 116, and the third amplifier 112 amplifies the transmission signal, which is then passed through the first duplexer 120 and mode switch 122 and transmitted from the external antenna 123.

The sixth frequency divider 131 frequency divides the output of the fifth frequency divider 130 to a 1-GHz signal which is then amplified by the third switching amplifier 108. The amplified signal is then frequency divided to a comparison frequency by the frequency synthesizer (variable frequency divider) 118, which compares the result with an externally supplied reference frequency and outputs a signal corresponding to the phase shift. The output from the frequency synthesizer 118 is passed through the loop filter 119 and applied to the first oscillator 100. This loop stabilizes the frequency of the carrier wave output from the first oscillator 100.

When operating in the second frequency mode (800 MHz) the second oscillator 101 produces a 3.2-GHz signal, which is frequency divided by the fifth and sixth frequency dividers 130, 131 into two 800-MHz carriers foI and foQ with a 90-degree phase difference. The first switching amplifier 106 amplifies carrier foI, and the second switching amplifier 107 amplifies the other 90-degree phase shifted carrier foQ. The amplifier output signals and the baseband signal from the baseband signal processor are input to the orthogonal modulator 109, which outputs a modulated signal.

This output from the orthogonal modulator 109 is then amplified by fourth and fifth amplifiers 113, 114, frequencies outside the required frequency band are removed by the second bandpass filter 117, and the sixth amplifier 115 amplifies the transmission signal, which is then passed through the second duplexer 121 and mode switch 122 and transmitted from the external antenna 123.

The signal frequency divided to 800-MHz by the sixth frequency divider 131 is then amplified by the third switching amplifier 108. The frequency synthesizer (variable frequency divider) 118 then divides the amplified signal to a comparison frequency, compares the result with an externally supplied reference frequency, and outputs a signal corresponding to the phase shift. The output from the frequency synthesizer 118 is passed through the loop filter 119 and applied to the second oscillator 101. This loop stabilizes the frequency of the carrier wave output from the second oscillator 101.

Note that the 2-GHz mode and 800-MHz mode are used in this second embodiment of the invention by way of example only, and the invention can be used to the same effect when operating at other frequencies.

Figure 5:
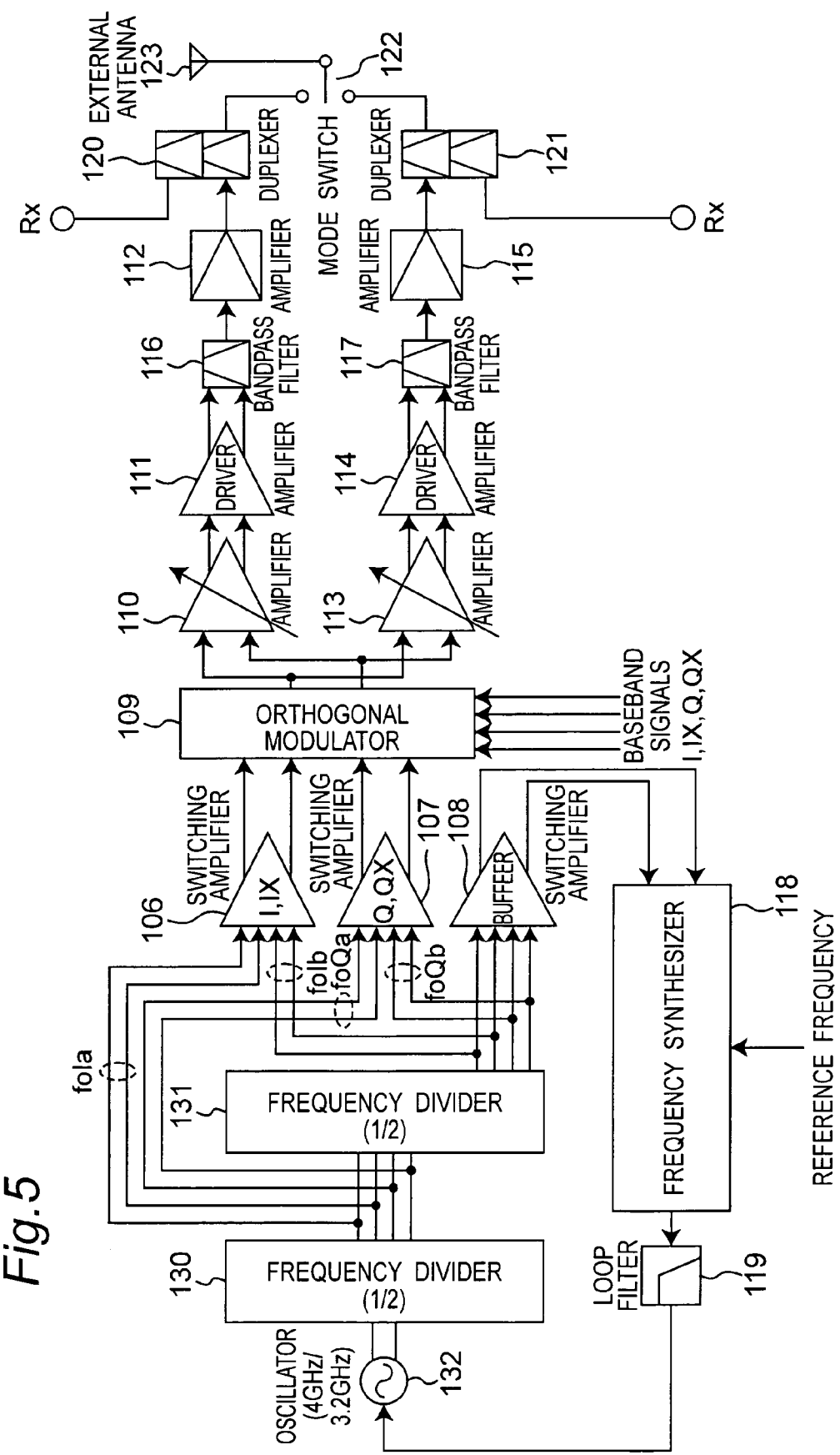
FIG. 5 is a schematic block diagram of a multimode wireless transmitter according to a third embodiment of the present invention.

FIG. 5 is a schematic block diagram of a multimode wireless transmitter according to a third embodiment of the invention. Note that like parts having the same function in this and the second embodiment shown in FIG. 4 are identified by the same reference numerals, and further description thereof is omitted below. This embodiment differs from the second embodiment in comprising a third oscillator 132.

When operating in a first frequency (2 GHz) mode, the third oscillator 132 generates a 4-GHz signal, which the fifth frequency divider 130 divides into two 2-GHz carriers foI and foQ with a 90 degree phase difference. The first switching amplifier 106 amplifies carrier foI, and the second switching amplifier 107 amplifies the other 90-degree phase shifted carrier foQ. The amplifier output signals and the baseband signal from the baseband signal processor are input to the orthogonal modulator 109, which outputs a modulated signal.

Output from the orthogonal modulator 109 is then amplified by the first and second amplifiers 110, 111, frequencies outside the required frequency band are removed by the first bandpass filter 116, and the third amplifier 112 amplifies the transmission signal, which is then passed through the first duplexer 120 and mode switch 122 and transmitted from the external antenna 123.

The sixth frequency divider 131 frequency divides the output of the fifth frequency divider 130 to a 1-GHz signal which is then amplified by the third switching amplifier 108. The amplified signal is then frequency divided to a comparison frequency by the frequency synthesizer (variable frequency divider) 118, which compares the result with an externally supplied reference frequency and outputs a signal corresponding to the phase shift. The output from the frequency synthesizer 118 is passed through the loop filter 119 and applied to the third oscillator 132. This loop stabilizes the frequency of the carrier wave output from the third oscillator 132.

When operating in the second frequency mode (800 MHz) the third oscillator 132 generates a 3.2-GHz signal, which is frequency divided by the fifth and sixth frequency dividers 130, 131 into two 800-MHz carriers foI and foQ with a 90-degree phase difference. The first switching amplifier 106 amplifies carrier foI, and the second switching amplifier 107 amplifies the other 90-degree phase shifted carrier foQ. The amplifier output signals and the baseband signal from the baseband signal processor are input to the orthogonal modulator 109, which outputs a modulated signal.

This output from the orthogonal modulator 109 is then amplified by fourth and fifth amplifiers 113, 114, frequencies outside the required frequency band are removed by the second bandpass filter 117, and the sixth amplifier 115 amplifies the transmission signal, which is then passed through the second duplexer 121 and mode switch 122 and transmitted from the external antenna 123.

The signal frequency divided to 800-MHz by the sixth frequency divider 131 is then amplified by the third switching amplifier 108. The frequency synthesizer (variable frequency divider) 118 then divides the amplified signal to a comparison frequency, compares the result with an externally supplied reference frequency, and outputs a signal corresponding to the phase shift. The output from the frequency synthesizer 118 is passed through the loop filter 119 and applied to the third oscillator 132. This loop stabilizes the frequency of the carrier wave output from the third oscillator 132.

Note that the 2-GHz mode and 800-MHz mode are used in this third embodiment of the invention by way of example only, and the invention can be used to the same effect when operating at other frequencies.

A wireless transmitter can also be provided using a multimode wireless transmitter according to any of the foregoing embodiments of the present invention with the first to sixth amplifiers, first and second bandpass filters, and first and second duplexers connected to the output stage of the orthogonal modulator, a mode switch, external antenna, and a receiving means (RX) connected through the first and second duplexers.

APPLICATION IN INDUSTRY

By not using the intermediate frequency band, a multimode wireless transmitter and a portable wireless device according to the present invention can reduce the number of oscillators and use a common modulator in different operating modes, thereby reducing device size. Furthermore, by using a common orthogonal modulator the number of signal input terminals on the baseband signal processor can also be reduced and adjusting for carrier leakage is easier. The present invention can thus be used as a high frequency integrated circuit in portable wireless communication devices.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A multimode wireless transmitter comprising:
   a first oscillator that oscillates at a first predetermined frequency;
   a first frequency divider that frequency divides the frequency of the signal generated by the first oscillator, and outputs a first carrier foIa and a second carrier foQa with a 90 degree phase difference therebetween;
   a second oscillator that oscillates at a second predetermined frequency that is different from the first predetermined frequency generated by the first oscillator;
   a second frequency divider that frequency divides the frequency of the signal generated by the second oscillator;
   a third frequency divider that further divides the frequency of the output signal of the second frequency divider, and outputs a third carrier foIb and a fourth carrier foQb with a 90 degree phase difference therebetween;
   a first switching amplifier that receives the first carrier foIa and third carrier foIb, selects the first or third carrier based on a control signal applied thereto, and amplifies and outputs the selected carrier;
   a second switching amplifier that receives the second carrier foQa and fourth carrier foQb, selects the second or fourth carrier based on a control signal applied thereto, and amplifies and outputs the selected carrier; and
   an orthogonal modulator for orthogonally modulating the baseband signal by means of the output signals from the first and second switching amplifiers.

2. A multimode wireless transmitter as described in claim 1, further comprising:
   a fourth frequency divider for frequency dividing the output signal frequency of the first frequency divider;
   a third switching amplifier that receives the output signal from the third frequency divider and the output signal from the fourth frequency divider, selects either output signal based on a control signal applied thereto, and amplifies and outputs the selected output signal;

a frequency synthesizer for comparing the selected output signal with a predetermined reference signal, and outputting a signal denoting the phase shift; and a loop filter for receiving the output signal of the frequency synthesizer;

wherein the oscillation frequency of the first oscillator or second oscillator is stabilized using output from the loop filter.

3. A multimode wireless transmitter as described in claim 1, wherein the first frequency divider and second frequency divider are combined in a single frequency divider.

4. A multimode wireless transmitter as described in claim 1, wherein the third frequency divider and fourth frequency divider are combined in a single frequency divider.

5. A multimode wireless transmitter as described in claim 1, wherein the first oscillator and second oscillator are combined in a single oscillator.

6. A multimode wireless transmitter as described in claim 1, wherein the fourth frequency divider requires less operating current than the first frequency divider.

7. A multimode wireless transmitter as described in claim 1, wherein the third frequency divider requires less operating current than the second frequency divider.

8. A multimode wireless transmitter comprising:

a first oscillator that oscillates at a first predetermined frequency;

a first frequency divider that frequency divides the frequency of the signal generated by the first oscillator, and outputs a first carrier foIa and a second carrier foQa with a 90 degree phase difference therebetween;

a second oscillator that oscillates at a second predetermined frequency that is different from the first predetermined frequency generated by the first oscillator;

a second frequency divider that frequency divides the frequency of the signal generated by the second oscillator;

a third frequency divider that further divides the frequency of the output signal of the second frequency divider, and outputs a third carrier foIb and a fourth carrier foQb with a 90 degree phase difference therebetween;

a first switching amplifier that receives the first carrier foIa and third carrier foIb, selects the first or third carrier based on a control signal applied thereto, and amplifies and outputs the selected carrier;

a second switching amplifier that receives the second carrier foQa and fourth carrier foQb, selects the second or fourth carrier based on a control signal applied thereto, and amplifies and outputs the selected carrier;

an orthogonal modulator for orthogonally modulating the baseband signal by means of the output signals from the first and second switching amplifiers;

a first processing circuit comprising
a first amplification means for amplifying output from the orthogonal modulator, and
a first antenna duplexing means connected to the first amplification means,
said first amplification means and first antenna duplexing means becoming operable when the first carrier foIa and second carrier foQa are selected;

a second processing circuit comprising
a second amplification means for amplifying output from the orthogonal modulator, and
a second antenna duplexing means connected to the second amplification means,
said second amplification means and second antenna duplexing means becoming operable when the third carrier foIb and fourth carrier foQb are selected;

a switch for selecting the first antenna duplexing means or second antenna duplexing means; and an antenna connected to said switch.

9. A multimode wireless transmission method comprising steps of:

oscillating at a first predetermined frequency;

frequency dividing the first predetermined frequency, and outputting a first carrier foIa and a second carrier foQa with a 90 degree phase difference therebetween;

oscillating at a second predetermined frequency that is different from the first predetermined frequency;

frequency dividing the second frequency;

further frequency dividing the 1/2-frequency divided second predetermined frequency, and outputting a third carrier foIb and a fourth carrier foQb with a 90 degree phase difference therebetween;

receiving the first carrier foIa and third carrier foIb, selecting the first or third carrier based on a supplied control signal, and amplifying and outputting the selected carrier;

receiving the second carrier foQa and fourth carrier foQb, selecting the second or fourth carrier based on a supplied control signal, and amplifying and outputting the selected carrier; and orthogonally modulating the baseband signal by means of the selected two output signals.

* * * * *